Jan. 1, 1952     C. J. NOELLE     2,580,583
ARTIFICIAL EYE
Filed July 24, 1947
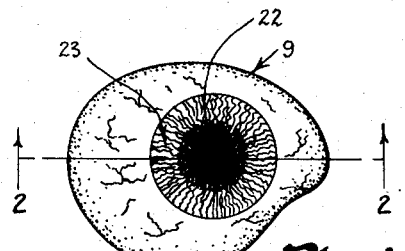
Fig. 1
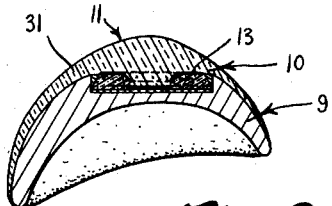
Fig. 2
Fig. 3
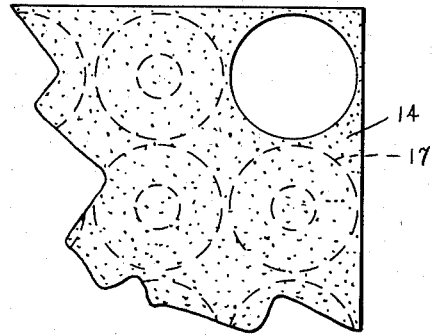
Fig. 4
Fig. 5
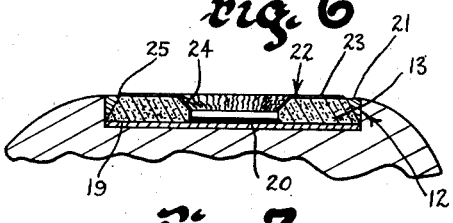
Fig. 6
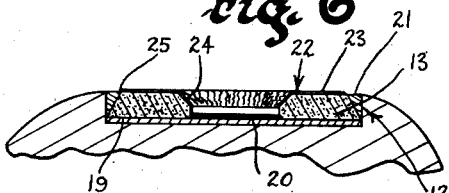
Fig. 7
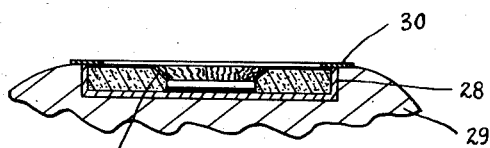
Fig. 8
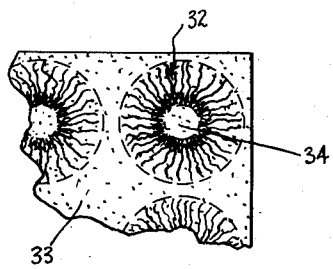
Fig. 9
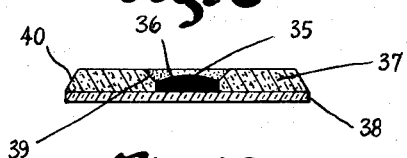
Fig. 10
INVENTOR.
CONRAD J. NOELLE
BY Louis L. Vagnon
ATTORNEY Patented Jan. 1, 1952

2,580,583

UNITED STATES PATENT OFFICE 2,580,583

ARTIFICIAL EYE

Conrad J. Noelle, Southbridge, Mass., assignor to American Optical Company, Southbridge, Mass., a voluntary association of Massachusetts Application July 24, 1947, Serial No. 763,329

10 Claims. (Cl. 3—13)

This invention relates to artificial eyes and more particularly to artificial eyes constructed of plastic material and novel method of making the same.

One of the principal objects of the invention is to provide an artificial eye constructed of plastic material which more closely resembles the natural characteristics of a normal eye and a more simple, efficient and economical method of making the same.

Another object is to provide a method of forming artificial eyes constructed of plastic material whereby the color of the iris portions of eyes of this character may be more accurately formed to simulate the appearance of the normal eye of the individual for whom such a plastic eye is being formed.

Another object is to provide a greatly simplified method of obtaining the base or foundation iris color for eyes of the above character and which will enable the various parts to be more positively and homogeneously united.

Another object is to provide an iris portion formed of a disc of initially transparent plastic material having dispersed therein a coloring material which in the resultant eye will constitute the base color of the iris portion thereof.

Another object is to provide a disc of initially transparent plastic material having dispersed therein a coloring material of the desired color or colors required as the base color of the iris to be formed and having on a surface thereof a pattern simulating the iris pattern desired and, in some instances, having a collarette thereon surrounding the pupillary area and of a color simulating the collarette of the normal eye of the individual for whom the artificial eye is being formed.

Another object is to provide pre-formed pupils either in flat or convex forms adapted to be fitted within the pupillary openings formed in iris discs of the above character.

Another object is to provide a novel method of forming the iris portion of artificial eyes formed of plastic material, which method comprises the step of forming a disc of initially transparent plastic material with a coloring material dispersed throughout the body of said disc and of the base color desired for the resultant iris and having printed, stamped, photo-lithographed or photographically produced on a surface thereof a colored iris pattern simulating the iris pattern of a human eye adapted to have varying densities from substantially opaque to transparent throughout the different portions thereof and through which the base color is visible and, in some instances, having formed thereon a further color pattern simulating the collarette surrounding the pupil of the eye as well as other iris colorings required to produce an eye simulating the normal eye of any given individual, the base color, iris pattern, collarette, etc. all functioning cooperatively to produce the resultant iris portion desired.

Another object is to provide simple, efficient and economical means and method of producing artificial eyes of the above character.

Another object is to provide a novel method of controlling the density of the base color of the disc in forming eyes of the above character.

Other objects and advantages of the present invention will become apparent from the following description taken in connection with the accompanying drawings and it will be apparent that many changes in the details of construction, arrangement of parts and methods shown and described may be made without departing from the spirit of the invention as expressed in the accompanying claims. I, therefore, do not wish to be limited to the exact details of construction, arrangement of parts and methods shown and described as the preferred forms only have been given by way of illustration.

Referring to the drawings:

Fig. 1 is a front elevational view of an eye formed according to the present invention;

Fig. 2 is a sectional view taken as on line 2—2 of Fig. 1 and looking in the direction indicated by the arrows;

Fig. 3 is a side elevational view of the eye;

Fig. 4 is a fragmentary view of sheet material employed in forming the iris portion and illustrating a step in the process of manufacture;

Fig. 5 is a sectional view of an iris disc as cut from the sheet illustrated in Fig. 4;

Fig. 6 is a view generally similar to Fig. 5 illustrating a differently shaped iris disc or button;

Fig. 7 is a fragmentary enlarged sectional view showing a further step in the process of manufacture;

Fig. 8 is a view generally similar to Fig. 7 and illustrating a slight modification of the invention;

Fig. 9 is a view generally similar to Fig. 4 of a further modified form of the invention; and Fig. 10 is a sectional view of an iris portion illustrating a further modification of the invention.

Although plastic artificial eyes are not broadly new in the art, only recently have they been made commercially available.

Many different methods of fabrication have been used in attempting to provide such eyes with characteristics simulating those of a normal human eye, but many difficulties have been encountered.

It has been possible, in the past, to produce plastic artificial eyes which, at the time of fabrication, possessed desirable characteristics, but such eyes in many instances have been found to be unstable during subsequent use.

One of the major difficulties encountered in forming such eyes was the subsequent development of interfacial separation between one or more of the parts of the eye throughout a portion of the contiguous surfaces thereof. This introduced flaws in iris color, interfacial glaze or haze and other defects, which were readily visible and rendered such eyes impractical for use.

Another major difficulty encountered in forming many prior art eyes of this nature was in being able to economically reproduce the desired color and iris pattern, iris size, shape, depth, pupillary size, etc. of a given normal human eye so that the artificial eye would have the general appearance and characteristics of said normal eye and in which all of the various component parts thereof, in the finished eye, would be in integrally bonded and homogeneous relation with each other and permanently retain the shape and visible characteristics to which it was initially formed.

Referring more particularly to the drawings wherein like characters of reference designate like parts throughout the several views, the artificial eye embodying the present invention comprises three major components which include the scleral portion 9, the iris portion 10 and a transparent covering 11.

The scleral portion 9 is preferably formed of a whitish translucent plastic material such as methyl methacrylate having white or other desired color pigments added thereto.

The said scleral portion may be formed by first taking an impression of the eye socket or by placing a number of different shapes and sizes of trial eyes into the eye cavity of the individual to be fitted. Such trial eyes may be made of a deformable or shape-alterable material such as inlay wax or the like whereby the particular shape characteristics of the individual's eye cavity may be determined. This trial eye is then used to make a mold from which the scleral portion of the eye may be formed. This is accomplished by placing a suitable deposit of the whitish translucent plastic material mentioned above in a doughy state in the mold and subjecting it to heat and pressure of an amount sufficient to cause the plastic to assume the shape of the molding cavity, which cavity has been previously formed to the shape of the selected trial eye. The molded plastic is thereby caused to set and harden to said shape through the completion of polymerization.

The countersink or recess 12 is then formed in the said molded plastic portion in the position where the iris is to be located and is of substantially the same diameter as that desired of the iris portion in the resultant eye. The recess is formed to a depth sufficient to receive the plastic button 13 which forms the base of the iris of the eye.

The button 13 is formed in the following manner:

A sheet of plastic material 14 such as methyl methacrylate having dispersed therein pigments of a desired color is first formed, as illustrated in Fig. 4.

The said sheet may be formed by different methods. For example, pigments of desired color may be mixed with the polymer and then mixed with the monomer to form a mass of doughy consistency. This may then be formed into a sheet as by placing between two glass plates or by any other known method.

If desired, a polymer monomer mixture of syrupy consistency may first be formed and the pigments then added thereto, and subsequently formed into sheets.

The pigments used in forming such sheet material are preferably iron oxides, lamp black, zinc oxide, titanium dioxide, ground glass colors or any known stable synthetic pigments. Said pigments are preferably opaque in nature but the amount of pigments used in forming the sheeting is such as to produce a colored sheet having a transparency, which transparency is derived from the substantially uniform dispersing of said particles throughout the body of the sheeting and the interstices between said particles. If desired, however, some of the pigments may be inherently of a transparent nature.

The color of the button 13 is such as to form the base color of the iris desired, either blue, brown, gray, green, yellow or mixtures thereof as the case may be.

In forming the button 13 from the sheet 14, the central aperture 15 is first formed through the said sheet 14. During the forming of the aperture 15, a bevel 16 is simultaneously formed. This results from the particular shape of tool used. The bevel 16 is for the purpose of providing an area on which a collarette may be formed and functions to give the effect of depth to the pupil of the eye.

The button 13 is then cut along the dash lines 17, see Fig. 4, to the contour size desired and in concentric relation with the aperture 15. During the cutting of the button 13 from the sheet 14, the tool employed simultaneously forms a bevel 18. The button 13, therefore, has an aperture 15 therein of the size desired for the pupil aperture of the resultant eye and is of a diameter substantially that desired of the resultant iris.

The button 13 is then secured in the recess 12 by means of a syrupy polymer monomer mixture 19, which is preferably a mixture of polymeric methyl methacrylate and monomeric methyl methacrylate of a doughy or syrupy consistency.

A polymer monomer mixture having black pigments therein is used in forming the pupil 20. As shown in Fig. 7, a relatively thin layer of said mixture is placed within the pupillary aperture 15 and in bonded relation with the base of the recess 12 by means of the syrupy polymer monomer mixture 19.

If desired, however, a thin sheet of polymer monomer mixture having black pigments therein may be initially positioned in the bottom of the recess throughout the entire area thereof or throughout the pupil area and the disc 13 may thereafter be secured in the recess.

If desired, instead of forming the polymer monomer mixture having the pigments dispersed therein in the form of a sheet, the doughy mixture may be molded directly to the shape and size of the button desired. The main feature of interest, however, is that the pigments be dispersed throughout the body of the button and that the pigments be of the desired base color of the iris pattern to be formed.

By again referring to Fig. 7, after the button 13 has been secured within the recess 12, as set forth above, a translucent polymer monomer mixture having white pigments therein simulating the material used in forming the scleral portion 9 of the eye is placed about the contour of the button, as illustrated at 21. This forms a wedge-shaped annular member about the contour of the button.

After the annular wedge-shaped ring is formed and allowed to set, the excessive material is removed by grinding or is otherwise cut away to form an outer surface in flush relation with the adjacent outer surface of the scleral portion.

It is also pointed out that the thickness of the button 13 is such as to be substantially flush with the adjacent outer surface of the scleral portion.

The outer surface of the button is then painted through the use of pigments in a syrupy polymer monomer mixture. The pigments in this instance are selected according to the color desired for the collarette area 22 and the secondary field 23. The collarette and secondary field are preferably formed by brushing the material thereon so as to allow the base color to be visible therethrough. The collarette extends throughout the bevelled surface 16, as illustrated at 24 in Fig. 7.

If desired, prior to forming the collarette and field patterns on the button, the surface of the button may be coated with a clear syrupy polymer monomer mixture. This initial clear coating is allowed to set prior to painting the collarette and field patterns thereon.

It is to be understood, of course, that the colors selected in forming the collarette 22 and field portion 23 are chosen according to the color pattern desired of the finished eye.

The term "collarette" as used herein is intended to mean the color portion immediately surrounding the pupillary area and in most eyes is of a different color from the field and base color of the eye.

It is particularly pointed out that the wedge shape of the annular member 21 forms a blending ring about the contour of the iris button, that is, it increases in density from the apex 25 outwardly and thereby forms a ring of graded intensity which causes the sclera surrounding the iris to decrease in density toward the iris and produce a more pleasing blending effect.

If desired, instead of forming the button 13 with a bevelled edge, a button such as shown at 26 may be formed having substantially parallel side walls. This button 26 can be blanked from the sheet material 14 or molded to its final shape as desired. The button shown in Fig. 5 is preferably bevelled, as illustrated at 27 in Fig. 8, prior to its being secured within the recess 28 of the scleral portion 29.

The pupil, collarette and field colors may be formed in a manner similar to that described in connection with the construction shown in Fig. 7. In this instance, however, instead of forming an annular blending ring 21, the contour of the iris is blended with the adjacent scleral portion by means of a coating 30 applied over the meeting edges of the button and sclera. This coating 30 may be formed of a translucent syrupy polymer monomer mixture having white pigments therein or, in addition thereto, having other desirable color pigments.

In the construction shown in Fig. 7, a coating similar to the coating 30 may be applied over the blending ring 21 and adjacent contour edge of the button and the recess 12. In this instance, the colors are selected to simulate the color effect desired of the finished eye.

By following the above technique, an arcus senilis pattern may be formed about the iris to simulate such a condition prevalent in the normal eye of the individual for whom the artificial eye is being formed.

Subsequent to the forming of the iris portion, as described above, a layer 31 of transparent clear methyl methacrylate is formed over said iris portion and over the adjacent portion of the sclera of the eye. It is to be understood, however, that, prior to placing the layer 31 over the sclera and iris insert, the outer or anterior surface of the sclera is provided with a capillary pattern simulating the sclera of the normal eye and, in addition thereto, a wash of pigmented syrupy polymer monomer mixture may also be applied to said anterior surface to reproduce the surface color pattern in the sclera of the normal eye of the individual for whom the eye is being formed.

The outer transparent layer 31 is shaped to the outer corneal surface shape of the eye and the said transparent layer may extend partially or entirely throughout the surface of the sclera.

The eye is ground and polished to the finished shape and size desired in the conventional manner.

In Fig. 9, there is illustrated a further modification of the invention, in which instance an iris pattern 32 is formed directly on one or both of the side surfaces of the impregnated sheet 33 from which the disc is to be formed. It is to be understood that the disc may be formed by cutting or otherwise. The disc may also be formed separately. It is to be understood, however, that the disc, in either instance, comprises an initially transparent plastic sheet having the desired base color or colors dispersed throughout the body thereof, such as described above in connection with the sheeting 14. One one or both of the side surfaces of the disc or sheet, there is provided a pattern 32 having the appearance of the fibrous pattern of the iris and of the color or colors desired for producing the resultant appearance characteristics and iris color of the eye. This may be black, brown, blue, grey, etc. or combinations of said colors depending upon the color or colors desired to be combined with the base color. The fibrous pattern 32 may be formed by printing, stamping, photo-lithographing, photographing or etching and filling in the desired pattern on one or more of the surfaces of the disc or sheeting.

The central pupillary area 34 is cut out as set forth above in connection with the irises formed from the sheeting 14 to receive the pupillary portion. It is to be understood that the iris pattern varies in density from nearly opaque to transparent throughout the different portions thereof and that the base color of the disc is visible therethrough.

Surrounding the pupillary opening 34 there may be provided a coloring to produce a collarette simulating that of the normal eye of the individual for whom the artificial eye is being formed. This may be produced by printing, painting or stamping the collarette thereon. It is also to be understood that the fibrous pattern may be formed by painting or by color transfers or the like, if desired.

To vary the density of color of the disc, such as shown at 37 in Fig. 10, the disc may be varied in thickness and may be provided with a transparent backing disc 38 of a thickness to compensate for the amount of material removed from the disc 37. If desired, the depth of the recess in the main ball portion 9 of the eye may be controlled according to the resultant thickness of the disc 37.

The pupillary portion 35 may be formed of a polymer monomer mix having a black pigment therein and prefabricated to the form of a button having an outer flat or convex surface 36. It is to be understood that the prefabricated pupillary portion is of a size which will fit within the recess 34.

Although it has been specified that the iris pattern formed on the disc having the base color desired may be placed on either one or the other of the outer surfaces thereof or both, it is to be understood that the pattern is preferably placed on the front surface of the disc so that the base color is visible therethrough. In instances, however, where the thickness of the disc is varied to control the density of its color, the said iris pattern may be formed on the rear surface thereof. It may be sandwiched between two discs with at least one of said discs having the coloring material or pigments dispersed therein. It is quite obvious that the front disc of the sandwich might be clear and have the iris pattern formed thereon, while the underlying disc might be formed of the transparent material having the coloring material or pigments dispersed therein. Likewise, instead of forming the pattern on the transparent disc, it might be formed on the disc having the coloring therein, or portions of the pattern might be formed on both and then placed in superimposed relation with each other.

It is to be understood that, prior to forming the collarette adjacent the pupillary opening, the said opening may be bevelled, as shown at 39 in Fig. 10. The outer contour edge 40 of the disc may also be provided with a bevel in order to produce a more pleasing blend of the contour edge of the disc with the scleral portion of the eye when the disc is secured in the recess in a manner such as illustrated in Fig. 7. It is to be understood, however, that the said disc 37 may be formed with a square edge such as shown in Fig. 8, in which instance the remaining assembly of the eye will be similar to that described in connection with Fig. 8.

From the foregoing description, it will be seen that simple, efficient and economical means and methods have been provided for accomplishing all the objects and advantages of the invention.

Having described my invention, I claim:

1. An artificial eye comprising a ball portion formed of translucent plastic material having a recess therein, an iris portion positioned in said recess and a layer of transparent material over said iris portion, said iris portion comprising a disc of relatively thin plastic material having coloring material substantially uniformly dispersed therein and of the color desired for the base color of the iris and having a central opening, said disc having additional coloring material on a side surface thereof through which the base color of the disc is visible and functioning cooperatively with said base color to produce the iris pattern and color desired of the resultant eye, and plastic material having a black pigment therein positioned to be visible through said opening in the iris disc and adapted to form the pupil of the resultant eye, said disc having a beveled outer contour edge and adapted to form a V-shaped channel surrounding said disc when positioned in said recess and a plastic material of a controlled color positioned within said V-shaped channel and adapted to form a blending ring surrounding said iris portion.

2. An artificial eye comprising a ball portion formed of translucent material integrally bonded with an outer layer of transparent material and an iris portion interposed therebetween, said iris portion comprising a disc of plastic material having a coloring ingredient substantially uniformly dispersed throughout the body thereof and further having a substantially central opening therein, said disc having a beveled edge surrounding the contour thereof and having a beveled area surrounding and extending within the central opening and having a pattern of one or more colors formed on a side surface thereof embodying areas varying in density from nearly opaque to transparent, said pattern extending into said bevelled area within the central opening and functioning cooperatively with the color ingredient dispersed throughout the material of said disc to produce the color effect and appearance desired of the resultant eye and means positioned to be visible through the central opening for producing the pupil of the eye.

3. An artificial eye comprising a ball portion formed of translucent plastic material having an outer layer of transparent material and an iris portion interposed therebetween, said iris portion comprising a relatively thin piece of material having a central opening formed therein, said iris portion having a pattern formed on a side surface thereof and extending onto the walls of said opening simulating the fibrous pattern of the iris, and pupillary means visible through said central opening.

4. An artificial eye comprising a ball portion formed of translucent plastic material having an outer layer of transparent material and an iris portion interposed therebetween, said iris portion comprising a piece of relatively thin material embodying the color and pattern of an eye, said iris portion having a centrally disposed opening therein, a bevelled area surrounding and extending within said opening having a pattern of color simulating the collarette of the natural eye and means positioned to be visible through said opening and for forming the pupil of the eye.

5. An artificial eye comprising a ball portion formed of translucent plastic material having an outer layer of transparent material and an iris portion interposed therebetween, said iris portion comprising a piece of relatively thin plastic material embodying the color desired for the iris and having a pigmented layer on a surface thereof simulating the pattern of an iris, said iris portion having a centrally disposed opening therein, said opening having bevelled sidewalls and means positioned to be visible therethrough and for forming the pupil of the eye, said pigmented layer on the surface of the iris portion extending into and coating the bevelled sidewalls of the pupillary opening.

6. In an artificial eye, an iris portion comprising a disc having a central aperture therein, a layer of pigment extending over the anterior surface of said disc and onto the sidewalls of said aperture, and pupillary means disposed to be visible through said aperture.

7. An artificial eye comprising a main body portion having a transparent covering on the forward surface thereof and an iris member disposed beneath said covering, said iris member comprising a centrally apertured disc of plastic material embodying the pattern and color of a natural iris, the surrounding walls of said aperture in the disc being pigment-coated, and pupillary means visible through said aperture.

8. In an artificial eye, an iris portion comprising a disc having a central aperture therein and a beveled area surrounding and extending within said aperture, a layer of pigment extending over the anterior surface of said disc and into said beveled area within the aperture, and pupillary means disposed to be visible through said aperture.

9. An artificial eye comprising a main body portion having a transparent covering on the forward surface thereof and an iris member disposed beneath said covering, said iris member comprising a disc having a central opening therein and a beveled area extending within said opening, the beveled area extending within said aperture and at least one surface of the disc being pigment-coated, and pupillary means visible through said aperture.

10. In an artificial eye, an iris portion comprising a disc of plastic material embodying the pattern and color of a natural iris, said disc having a central opening therein, and a pupillary member positioned in said opening, said pupillary member having its front surface of convex shape and disposed posteriorly of the front surface of the disc.

CONRAD J. NOELLE.

REFERENCES CITED

The following references are of record in the file of this patent:

UNITED STATES PATENTS

| Number | Name | Date |
| --- | --- | --- |
| 1,763,312 | Marcus | June 10, 1930 |
| 2,391,305 | Galeski | Dec. 18, 1945 |
| 2,394,400 | Noles | Feb. 5, 1946 |
| 2,497,872 | Erpf et al. | Feb. 21, 1950 |

OTHER REFERENCES

"Apt Pupils," E. McKechnie, Canadian Industries Limited, December 1944, pp. 8 and 9. (A copy is in Division 55 of the U. S. Patent Office.)

"The Optician," volume CIX #2812 for Feb. 16, 1945, pp. 37–40. (A copy is in Division 55 of the Patent Office.) "Making Plastic Artificial Eyes" by J. H. Prince.